No. 758,300. PATENTED APR. 26, 1904.
J. DAVIDSON.
MACHINE FOR CLEANING COTTON SEED.
APPLICATION FILED JUNE 25, 1903.
NO MODEL. 2 SHEETS—SHEET 1.
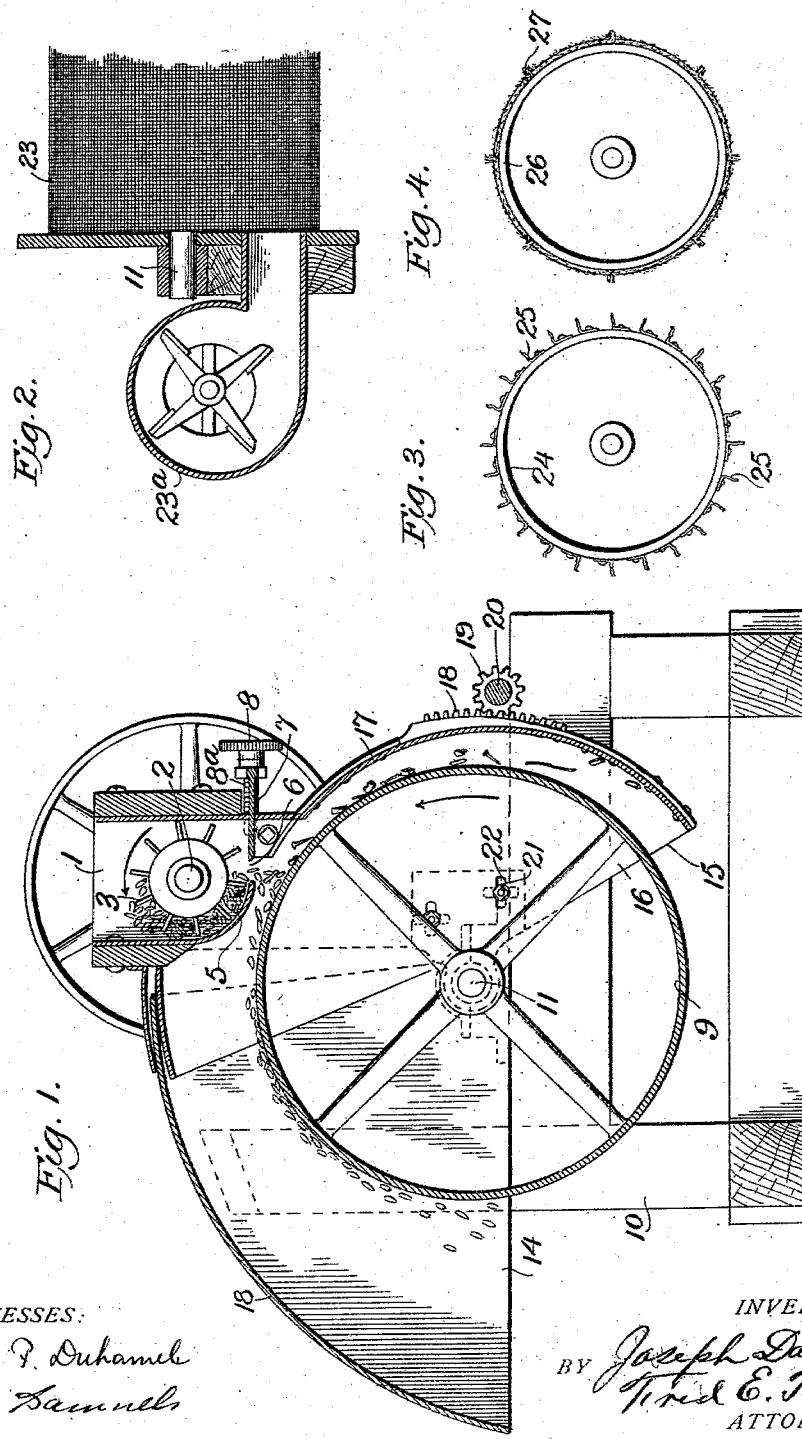
WITNESSES:
James P. Duhamel
A. E. Samuels
INVENTOR.
Joseph Davidson
BY Fred E. Tasker
ATTORNEY.

No. 758,300. PATENTED APR. 26, 1904.
J. DAVIDSON.
MACHINE FOR CLEANING COTTON SEED.
APPLICATION FILED JUNE 25, 1903.
NO MODEL. 2 SHEETS—SHEET 2.
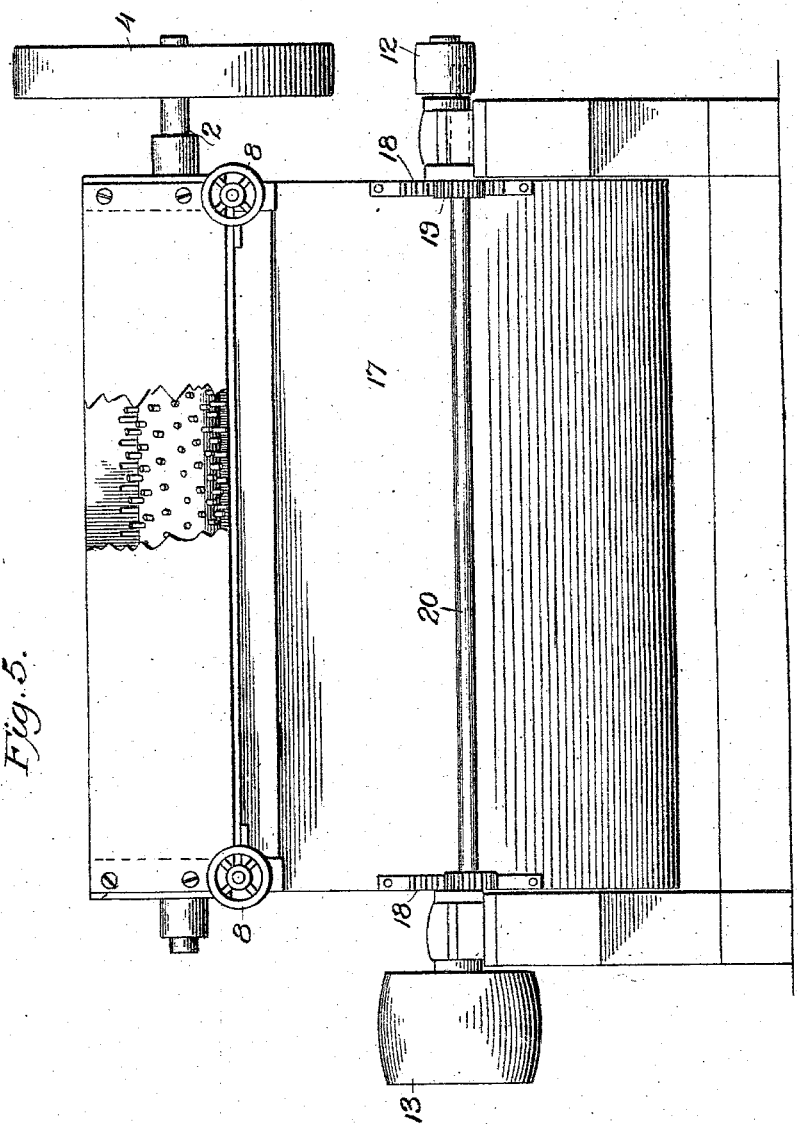
WITNESSES:
James F. Duhamel
A. E. Samuels
INVENTOR.
Joseph Davidson
BY
ATTORNEY.

UNITED STATES PATENT OFFICE.

JOSEPH DAVIDSON, OF ATLANTA, GEORGIA, ASSIGNOR TO THE SOUTHERN COTTON OIL COMPANY, OF JERSEY CITY, NEW JERSEY, A CORPORATION OF NEW JERSEY.

MACHINE FOR CLEANING COTTON-SEED.

SPECIFICATION forming part of Letters Patent No. 758,300, dated April 26, 1904.

Application filed June 25, 1903. Serial No. 163,059. (No model.)

*To all whom it may concern:*

Be it known that I, JOSEPH DAVIDSON, a citizen of the United States of America, and a resident of Atlanta, in the county of Fulton and State of Georgia, have invented certain new and useful Improvements in Machines for Cleaning Cotton-Seed, of which the following is a specification.

My present invention relates to certain new and useful improvements in a machine for cleaning cotton-seed or any other similar material, the principal object being to separate from the seed foreign particles, such as rocks, nails, fragments of wood, and the like; and the invention consists fundamentally in a revolving cylinder and an appurtenant feed mechanism and also in various details and combinations, substantially as hereinafter described and claimed.

In the accompanying drawings, illustrating my invention, Figure 1 is a transverse section of my improved seed-cleaning machine. Fig. 2 is a detail sectional view showing a blast employed with a drum made of wire-cloth. Fig. 3 is a detail end view of a modified form of cylinder or drum clothed with card-clothing. Fig. 4 is an end view of another modified form of revolving drum clothed with narrow strips of cloth. Fig. 5 is a side elevation of the machine.

Similar numerals of reference designate like parts throughout the different figures of the drawings.

1 denotes a hopper into which the cotton-seed or other material to be cleaned is fed from a spout, conveyer, or feed device. As the hopper is of some length, the seed is distributed throughout the same from end to end, the distribution being accomplished by means of a roller 2, suitably journaled at the ends in the hopper 1 and provided on one of its projecting ends with a pulley 4, to which a drive-belt is applied. The roller 2 is provided with lugs 3, which are set at an angle in order that the roller may act as a conveyer to carry the seed along and distribute it evenly through the opening 6 in the bottom of the hopper. Said opening is formed between the edges of the curved portion 5 of the bottom of the hopper and the adjustable horizontal plate 7, whose adjustment is effected by means of screws $8^a$, having hand-wheels 8. Through longitudinal opening 6, therefore, the seed containing the usual proportion of foreign and extraneous matter passes to the action of the cleaning-drum. Whatever surplus there is of seed flows out of the open end of hopper 1 onto the floor or into some receptacle or bin placed there to receive it.

Below the hopper 1 is a revolving cylinder or drum 9, having a shaft 11, on one end of which is a belt-pulley 12, around which may pass the same belt that is in contact with the pulley 4, and on the other end of shaft 11 is another belt-pulley, 13. This drum has its shaft 11 journaled in suitable bearings in a main frame 10, which is preferably of a stout wooden or metal construction in order to withstand the vibration due to the revolution of the drum. The seed from the hopper 1 will obviously flow in a steady stream upon the drum 9 and will be carried thereby upward and over in the direction of rotation, as shown by the arrow in Fig. 1. This movement is caused by the friction of the seed against the drum and by the blast of air generated through the motion of the drum within its casing, seed being delivered at 14 into a conveyer which transports them to the mill or any other distant point. Rocks, fragments of stone and wood, nails, pieces of metal, and other hard or objectionable foreign and extraneous substances that are heavier than the seed will not be carried along with the seed by the air-blast, but will fall by gravity over the face of the drum, inasmuch as the friction between them and the face of the drum is less than that of the seed, and hence these foreign substances will slide downwardly and become separated from the seed, as shown in Fig. 1, against the direction of rotation of the drum and finally will be removed from the machine at the bottom at 15.

The drum 9 is incased by housings 16 at the sides and a plate 17 at the front and also the breast or concave 18 at the rear. The plate 17 is provided at each end with a rack 18, engaged by a pinion 19 on a pinion-shaft 20. This rack-and-pinion construction permits the plate 17 and the housings 16 to be adjusted relatively to the drum and to the breast 18 to regulate the size of the channel which conveys the air-blast. It will be observed that the housings 16 are supported pivotally and removably on the bearing-boxes of the drum 9, and that they carry the hopper 1 and are susceptible of a rotary motion within certain limits around the drum-bearings, whereby the channel through which the air-blast passes is not only regulated, but also the point of delivery of seed from the opening 6 to the drum 9 is governed. The housings 16 are held rigidly in any desired position or are allowed an adjusting movement, as explained, by tightening or loosening set-screws 21, that pass through slots 22, the slots being cut in plates rigidly secured to the drum-bearings and the set-screws being carried by the housings, or vice versa, as preferred.

The drum or cylinder 9 is susceptible of various modifications. It may, as shown in Fig. 1, consist simply of a drum having a metal face revolving with sufficient velocity to set in motion a belt or channel of air between itself and the surrounding casing, which air-current will be sufficiently strong, together with the friction of the seed against the drum, to carry the seed up and over in the direction of rotation of the drum, but not strong enough to carry in the same manner the heavy particles of foreign substances, said particles sliding down the drum against the direction of rotation and becoming separated from the seed. A modification of this drum is shown in Fig. 2, where it is shown consisting of wire-cloth, as at 23, with a wire-cloth drum of this kind the seed will be delivered to and held against the drum by a blast of air from without and by the suction from a fan arranged in a casing, as 24, at the end of the drum, so that it may exhaust air from the interior of the latter. In this case the principle involved is that the seed will be held against the drum by a blast of air strong enough to cause the seed to stick to the drum and to pass over to the point of delivery as the drum revolves, but not strong enough to carry or hold the fragments of rock, metal, and other foreign substances. In Fig. 3 I show another modification where the drum 24 is clothed with hair-cloth having ends projecting perpendicular to the surface of the drum, or wire-cloth, as at 28, commonly called "card-clothing," or other similar material with which the seed is to be delivered, as in previous cases; but the principle of operation involved is that the seed will be carried around by the drum because of the lint on the seed adhering to the rough surface, while the foreign substances will not be caught. In Fig. 4 is a still further modified form of the drum, as 26, which is clothed with narrow strips of cloth 27, that are held perpendicular to the surface of the drum by centrifugal force. The seed is delivered to these strips and carried over by them, while the heavier particles of rock or metal when they hit the strip will knock it out of shape, so that it will fall away and the heavy particle will not be carried over thereby. Various other modifications will suggest themselves to those skilled in the art.

Having thus described my invention, what I claim as new, and desire to secure by Letters Patent, is—

1. In a machine for cleaning cotton and similar seed, the combination of a feed device, a revolving drum, a surrounding case, means for adjusting the outlet from the feed to the drum, and means for regulating the size of the channel between the drum and casing in which the air-blast is generated.

2. In a machine for cleaning cotton and other seed, a revolving drum in combination with a hopper, a revolving seed-distributer therein, means for adjusting the outlet from the hopper to the revolving drum, and means for regulating the size of the channel between the drum and its casing.

3. In a machine for cleaning cotton-seed and other similar material, the combination with a revolving drum, of a surrounding casing, means for regulating the feed of the seed to the drum, and means for regulating the size of the channel in which the air-blast is generated.

Signed at Atlanta, Georgia, this 22d day of June, 1903.

JOSEPH DAVIDSON

Witnesses:
 WALTER D. NASH,
 L. C. STEVENSON.